(No Model.) 3 Sheets—Sheet 1.
S. L. TERRY.
FLUID PRESSURE RECORDER FOR BRAKE MECHANISMS.
No. 581,965. Patented May 4, 1897.
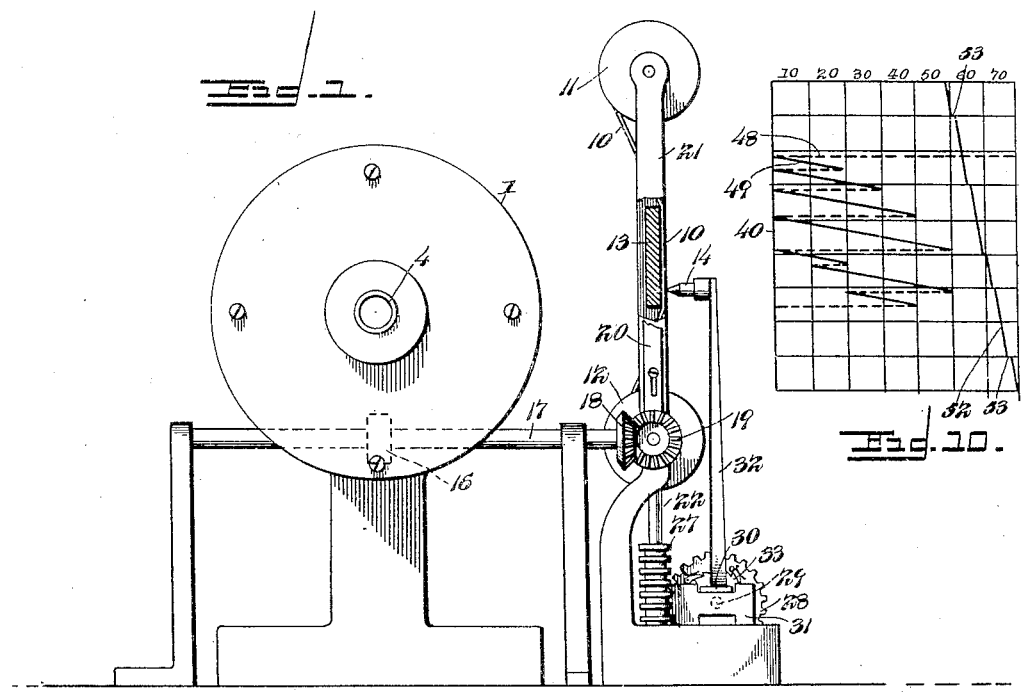
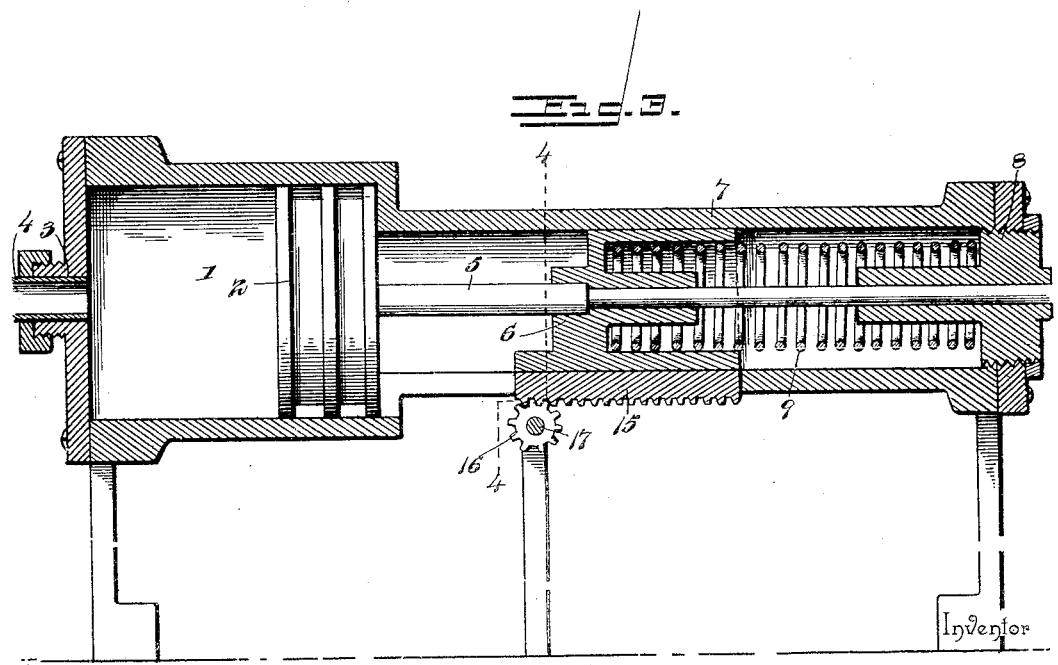
Witnesses
Inventor
Samuel L. Terry
By his Attorneys, (No Model.) 3 Sheets—Sheet 2.
S. L. TERRY.
FLUID PRESSURE RECORDER FOR BRAKE MECHANISMS.
No. 581,965. Patented May 4, 1897.
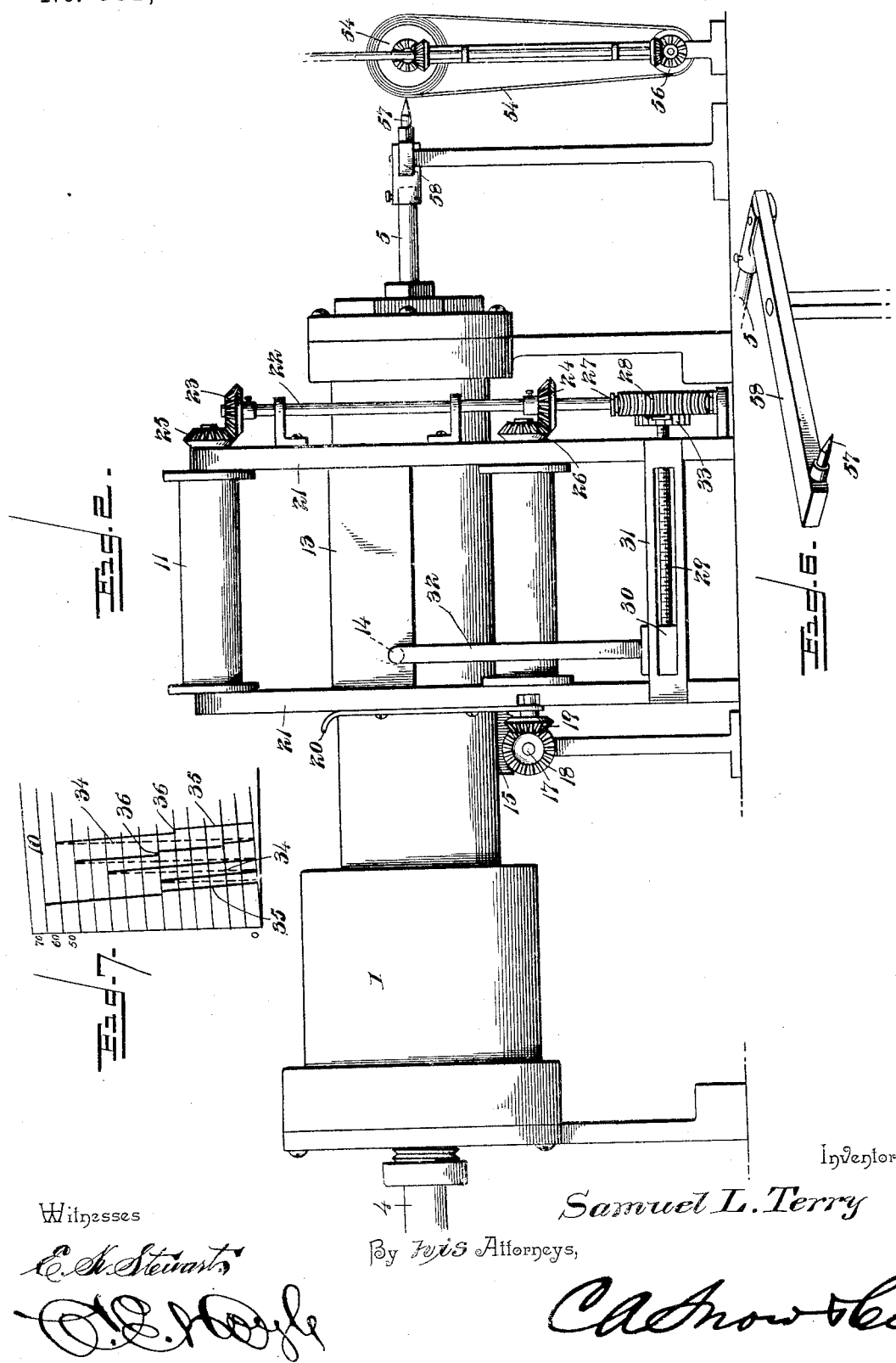
Witnesses
E. S. Stewart
O. E. Doyle
Inventor
Samuel L. Terry
By his Attorneys,
C. A. Snow & Co.

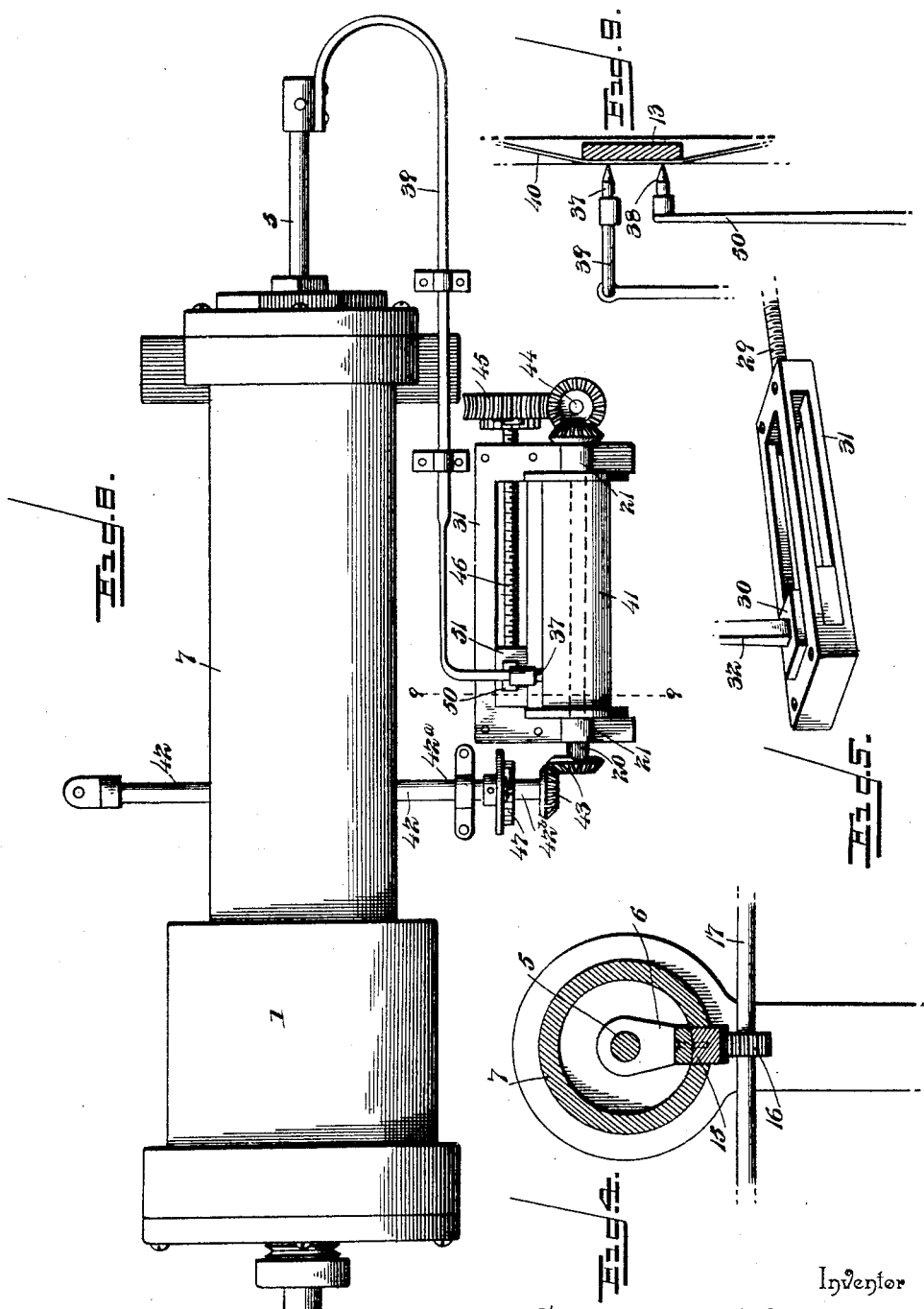

UNITED STATES PATENT OFFICE.

SAMUEL L. TERRY, OF PHILLIPSBURG, KANSAS.

FLUID-PRESSURE RECORDER FOR BRAKE MECHANISMS.

SPECIFICATION forming part of Letters Patent No. 581,965, dated May 4, 1897.

Application filed January 13, 1896. Serial No. 575,354. (No model.)

*To all whom it may concern:*

Be it known that I, SAMUEL L. TERRY, a citizen of the United States, residing at Phillipsburg, in the county of Phillips and State of Kansas, have invented a new and useful Fluid-Pressure Recorder for Brake Mechanisms, of which the following is a specification.

My invention relates to a recording device for fluid-pressure brake mechanism; and the object in view is to provide means whereby a record is made of the pressure in the train-pipe before and after each reduction, such reduction being caused by the application of the brakes, together with the number of reductions made in the course of applying the brakes and the amount of pressure expended at each reduction.

Further objects and advantages of this invention will appear in the following description, and the novel features thereof will be particularly pointed out in the appended claims.

In the drawings, Figure 1 is an end view of a recording mechanism constructed in accordance with my invention. Fig. 2 is a side view of the same. Fig. 3 is a longitudinal section of the cylinder exposed to train-pipe pressure. Fig. 4 is a transverse section on the line 4 4 of Fig. 3. Fig. 5 is a detail view in perspective of the marker-arm carrier and the guide in which it is mounted. Fig. 6 is a detail view in perspective of the marker-arm forming a part of the speed-recording mechanism used in connection with the pressure-recorder. Fig. 7 is a diagram showing the record produced by the pressure-recording devices. Fig. 8 is a plan view of a slightly-modified form of recording mechanism. Fig. 9 is a detail vertical section on the line 9 9 of Fig. 8 to show the marker as used in connection with the recording device illustrated in Fig. 8. Fig. 10 is a diagram showing the record produced by the said modified construction of recorder.

Similar numerals of reference indicate corresponding parts in all the figures of the drawings.

1 designates a cylinder in which operates a piston 2, permanently exposed to train-pipe pressure and hence affected by both increase and reduction of pressure, the cylinder being provided with an inlet-opening 3, with which communicates a conductor 4, adapted to be connected with the train-pipe. (Not shown.) Connected to the piston-rod 5 is a cross-head or plunger 6, operating in a tubular guide 7 in communication with the cylinder, and seated at one end upon said cross-head or plunger and at the other end against the removable and adjustable plug 8 at the end of the guide 7 is a tension-spring 9, which is opposed to the advance movement of the piston and hence returns or moves the piston in the reverse direction when the pressure in the train-pipe is reduced. The tension of said spring may be regulated to secure accuracy and uniformity of operation by adjusting the seat formed by the plug 8.

Various forms of recording devices may be employed in this connection to indicate at all times the pressure in the train-pipe, but it will be sufficient to illustrate two forms operating upon substantially the same principle, both being adapted to show the amount of pressure expended at each application by means of the reduction of the train-pipe pressure or the difference between the previous and the subsequent pressures in the train-pipe.

The preferred form of recording mechanism, which is illustrated in Figs. 1 to 7, inclusive, embodies a recording medium 10, consisting of a web or belt carried by spaced spools 11 and 12 and traversing a backing-plate 13, located between the spools, said recording medium being operatively connected with the piston 2 and adapted to receive a vibratory or forward-and-backward movement in accordance, respectively, with the forward and backward movements of the piston due to the variations of pressure in the train-pipe. In connection with this recording medium, which has a linear movement in a prescribed path, I employ a coöperating inscribing medium consisting of a pointer or pencil 14, which traverses the surface of the recording medium at the point arranged in contact with the backing-plate 13, said inscribing medium having a linear movement in a direction perpendicular to that of the recording medium or across the path of the latter. Motion is imparted to the inscribing medium by the piston through interposed connections, which will be hereinafter described, such means being of a construction whereby the inscribing medium receives motion only during the movement of the piston in one direction, suitable clutch mechanism being interposed to slip idly during the other movement of the piston and allowing the inscribing medium to remain at rest. In the construction illustrated motion is imparted to the inscribing medium during the backward movement of the piston, or the movement thereof which is caused during a reduction of the pressure in the train-pipe. Hence inasmuch as the inscribing medium is arranged permanently in contact with the surface of the recording medium any movement of either the recording or the inscribing medium will produce an impression upon the surface of the former, and inasmuch as the recording medium is adapted to receive either forward or backward motion to correspond with the motion of the piston, whereas the inscribing medium receives motion only during the backward or return movement of the piston, the impression upon the recording medium during the forward movement of the piston will be due wholly to the movement of the recording medium and hence will be a straight line. On the other hand, an impression produced upon the recording medium during the backward or return movement of the piston will be controlled by the combined movements of the recording and inscribing mediums, and as said recording and inscribing mediums move in directions perpendicular to each other the impression produced upon the recording medium will be the resultant of the said two motions. In order to produce a record which may be read with facility, I preferably arrange the connections to cause a movement of the recording medium in excess of that of the inscribing medium, as will be fully understood from the following description.

Carried by the cross-head or plunger 6 is a rack 15, meshing with a pinion 16 on a transverse shaft 17, and said shaft carries a bevel-gear 18, which meshes with a similar gear 19 on one of the spools which carry the recording medium. In the construction illustrated the gear 19 is attached to the spindle of the spool 12, said spindle being capable of a slight longitudinal or axial movement independently of the spool 12, whereby the gear 19 may be thrown out of mesh with the gear 18 to check the movement of the recording devices. Said gear 19 is held in engagement with the gear 18 by means of a slide 20, mounted upon one side of the frame 21 and bifurcated at its lower end to engage a shoulder on the gear 19 when the parts are in operative position. Said frame 21 supports the upper and lower spools and also supports a counter or connecting shaft 22, having bevel-gears 23 and 24, which mesh with similar gears 25 and 26 on the spindles of the spools, whereby motion communicated to the spool 12 is also communicated equally to the spool 11.

Carried by the counter-shaft 22 is a worm 27, meshing with a worm-gear 28, which is fixed to the end of a feed-screw 29, and this feed-screw engages a threaded bore of a carrier 30, mounted in a transverse guide 31, arranged between the sides of the frame 21, or transverse to the direction of movement of the recording medium. Said carrier supports an arm 32, to which is attached the pencil or inscribing medium 14, above described. Interposed between the worm-gear 28 and the feed-screw 29 (or it may be at any other suitable point) is a clutch 33, whereby motion is communicated to the feed-screw only when the piston receives backward movement.

In Fig. 7 is shown a diagram of the record produced by the devices above described, the dotted lines 34 thereon representing the path of the inscribing medium during the forward movement of the piston, or the movement which it has during the increase of pressure in the train-pipe, while the solid lines 35 show the path of the inscribing medium during the return or backward movement of the piston, or when both recording and inscribing mediums are actuated, respectively, in directions which are perpendicular to each other. The forward movement of the inscribing medium across the face of the recording medium produces a straight line, or a line parallel with the direction of movement of the recording medium, as shown at 34, but the lines produced during the backward movement of the piston, or during the motion of both the recording and inscribing mediums, incline to the direction of movement of the recording medium, such inclination being due to the movement of the inscribing medium across the path of the recording medium. Hence each continuous inclined line indicates an application of pressure to the brake mechanism, or a reduction of pressure in the train-pipe equal to the number of spaces crossed by said line, the surface of the recording medium being divided into spaces designated to indicate pounds of pressure.

It is usual and preferable to apply the brakes by a plurality of successive applications of pressure to the brake-cylinder, thus causing a plurality of successive reductions of pressure in the train-pipe, to avoid "skating" the wheels, and each successive reduction of pressure in the train-pipe causes an inclined line 35 upon the face of the recording medium, the different lines or parts of lines being distinguished by shoulders or offsets 36. These shoulders or offsets in the lines, indicating reduction of pressure in the train-pipe, are caused by a slight springing or yielding movement of the arm carrying the pencil, said springing or yielding movement occurring at the end of each step in the movement of the recording medium. The movement of the recording medium being more rapid than that of the inscribing medium and the movement of the inscribing medium being transverse to the length of the arm 32, the pencil 14 does not receive the transverse movement as quickly as the carrier 30 and is held back until the movement of the recording medium and said carrier ceases, when the pencil is advanced in the direction of movement of the carrier by the resilience of the arm 32. This springing or yielding movement of the arm 32 is very slight, but is sufficient to form a distinguishable shoulder or offset, whereby the paths of the successive movements of the inscribing mediums may be readily seen. The length of a line between two of these offsets or shoulders shows the amount of reduction of pressure in the train-pipe during one application, and the number of these offsets or shoulders in one of the lines 35 shows the number of applications made to apply the brakes. After the brakes are released the pressure in the train-pipe increases, and the mechanism shows the increase and the amount of pressure in the train-pipe at the time of making the next application. If an application is made before the pressure reaches the prescribed seventy pounds, it is indicated by the termination of the line 34 and the beginning of a new line 35. It will be understood that the mechanism as described does not produce any distinguishing characteristic of the lines 34 and 35 other than the former being vertical or parallel with the direction of movement of the recording medium, while the latter is inclined or is a resultant of two motions. In the drawings I have distinguished between said lines by showing one dotted and the other solid in order to facilitate the reading of the illustration.

In Figs. 8 to 10 I have shown a modified form of my invention in which the record is formed by the combined movements of recording and inscribing mediums, said recording and inscribing mediums operating in paths at right angles to each other. In this form of the apparatus the inscribing medium comprises two pointers or markers 37 and 38, the former of which is carried by an arm 39, attached to the piston-stem 5, said stem being carried by a piston and actuated in a manner similar to that described in connection with the form of apparatus illustrated in Figs. 1 to 7, inclusive. Both of said pointers or markers are held permanently in contact with the continuous recording medium 40, as described in connection with the preferred form of the apparatus, and said recording medium is mounted for linear movement in one direction only.

As in the preferred form of the device, the recording medium is carried by spools, the upper one of which is shown at 41 in Fig. 8, and motion is communicated thereto from the shaft 42, which is actuated by a rack on the plunger operating in the tubular guide 7 through intermeshing bevel-gears 43, similar to the gears 18 and 19. Said spools are connected for simultaneous rotation by means of a counter or worm shaft 44, having suitable gears meshing with gears on the spool-spindles, and the worm meshes with a worm-gear 45, carried by a feed-screw 46, all constructed as described.

Inasmuch as it is desirable to impart step-by-step linear movement to the recording medium in one direction only I introduce a clutch 47, preferably between independent parts 42$^a$ and 42$^b$ of the shaft 42, said clutch locking the members of the shaft together during the backward movement of the piston and allowing the member 42$^a$ to turn idly during the forward movement. Hence during the forward movement of the piston under the increase of pressure in the train-pipe the marker 37 will traverse the surface of the recording medium in a straight line 48 parallel with the direction of movement of the piston, thus indicating by the limit of its movement in said direction the maximum pressure in the train-pipe at the time of making an application. When an application is made, the reduction of pressure in the train-pipe, and the consequent backward movement of the piston, causes the pointer 37 to traverse the surface of the recording medium in the opposite direction, but inasmuch as the recording medium has a linear movement in a path intersecting that of said pointer during the backward movement of the piston the resulting mark upon the surface of the recording medium will be an inclined or diagonal line 49, similar to that above described in connection with the recording medium 10. Thus the record produced upon the recording medium by the combined movements of the recording medium and the marker 37 will be similar to the record produced upon the recording medium 10 of the preferred form of the apparatus, the difference being that only the complete reduction of pressure required to apply the brakes and not the number of applications will be shown upon the recording medium 40. In order to show the number of applications or reductions, I employ a second marker 38, which is carried by an arm 50 on a carrier 51, actuated by the feed-screw 46, said marker 38 being similar in operation and construction to the inscribing medium referred to in connection with the preferred form of the apparatus. Inasmuch, however, as the recording medium 40 receives a step-by-step movement in one direction only the path or mark 52 caused by the marker 38 in traversing the recording medium will show a series of inclined lines provided at intervals with offsets or shoulders 53 to show the points at which successive reductions terminate. Thus in this modified form of the apparatus, where one member of the inscribing medium is carried directly by the stem of the piston, a second member is necessary to show the number of reductions necessary to complete an application of the brakes, only the amount of pressure before and after a complete application being shown by the marks formed by the member 37.

From the above description it will be seen that the recording and inscribing mediums travel in intersecting paths, one medium in each case operating in opposite directions in accordance with the operations of the piston which is exposed to train-pipe pressure, while the other medium receives motion in only one direction or during the movement in one direction of the piston. Furthermore, it will be seen that in both forms of the apparatus the inscribing and recording mediums are in permanent contact and that said mediums receive a step-by-step movement controlled by the movements of the piston which is exposed to train-pipe pressure.

The record progresses transversely of the sheet or web forming a part of the recording medium, and this sheet or web may be replaced to provide for forming a succeeding record or may be fed longitudinally by any suitable means, (not shown in the drawings,) inasmuch as the same form no part of my invention. The width of the sheet or web is sufficient in extent for a record of the applications of pressure during an entire trip, and said width may be varied to suit the length of the trip to be made by a locomotive having a given route.

In connection with the apparatus shown in Fig. 2 of the drawings I preferably employ means for indicating the number of complete applications of the brakes and the intervals, with the distances therebetween, of such complete applications, said apparatus including an endless recording medium 54, carried by drums 55 and 56, and a pointer 57, adapted to be brought into contact with the surface of the recording medium 54 when a complete application of the brakes has been made. The pointer 57 is carried by a lever 58, connected at one end to the piston-rod 5, and the drums are connected by suitable gearing with a rotating part, such as the axle upon one of the car-trucks. The medium 54 receives motion whenever the car is in motion, and by having its surface blocked off or graduated to represent distances, as miles and parts thereof, the distances of the several applications of the brake mechanism from a given starting-point will be indicated by the marks upon the surface of the medium.

In order that the lines upon the recording medium may be distinctive throughout their lengths, I have employed operating connections, such that while the recording medium is at rest during the movement of the inscribing medium in one direction (as, for instance, during the forward movement of the inscribing medium) the movement of the recording medium commences with and continues throughout the return movement of the inscribing medium. Hence the diagonal lines upon the recording medium start from the upper extremities of those lines indicating the increase of pressure in the train-pipe.

Various changes in the form, proportion, and the minor details of construction may be resorted to without departing from the spirit or sacrificing any of the advantages of this invention.

Having described my invention, what I claim is—

1. A pressure-recorder having inscribing and recording mediums arranged in permanent contact for movement in intersecting paths, a piston exposed to train-pipe pressure, and connections between the mediums and the piston whereby one of the mediums receives forward and return movement corresponding with those of the piston and the other medium receives forward movement during the return movement of the piston, to cause the marker of the inscribing medium to traverse the surface of the recording medium in an inclined path, and means for causing independent movement of the marker at the end of each simultaneous movement of the mediums, whereby successive partial reductions of pressure are indicated by offset lines on the recording medium, substantially as specified.

2. A pressure-recorder having inscribing and recording mediums arranged in permanent contact, and means for imparting simultaneous movement thereto in intersecting paths, the inscribing medium having a yieldingly-supported marker mounted for independent movement parallel with the path of the inscribing medium and adapted to be repressed out of its normal position during its forward movement by frictional contact with the recording medium, substantially as specified.

3. A pressure-recorder having recording and inscribing mediums arranged in permanent contact for movement in intersecting paths, a piston exposed to train-pipe pressure, and connections between the piston and said mediums, whereby the recording medium receives forward and rearward movement during the corresponding movement of the piston and the inscribing medium receives forward movement, only, during the rearward movement of the piston, the inscribing medium including a yieldingly-supported marker adapted for independent movement parallel with the surface of the recording medium and in the direction of the path of the inscribing medium, whereby it is repressed slightly out of its normal position during the advance movement of the inscribing medium by frictional contact with the recording medium, and is adapted to return to its normal position when its advance movement ceases, substantially as specified.

4. A pressure-recorder having recording and inscribing mediums arranged in permanent contact and mounted for movement in intersecting paths, a piston exposed to train-pipe pressure and connections between said mediums and the piston, the inscribing medium including a marker and a resilient arm carrying the marker and adapted to yield in the direction of its movement, substantially as specified.

5. A pressure-recorder having a reciprocatory recording medium, a piston exposed constantly to train-pipe pressure and having the recording medium operatively connected thereto, an inscribing medium including a carrier adapted to move in a path intersecting that of the recording medium, a resilient arm mounted on the carrier and supporting a marker in permanent contact with the surface of the recording medium, and means for advancing the carrier in a step-by-step movement as the pressure in the train-pipe is successively reduced, substantially as specified.

6. A pressure-recorder having a reciprocatory recording medium, a piston exposed constantly to train-pipe pressure and having the recording medium operatively connected thereto, an inscribing medium including a carrier mounted in transverse guides and a resilient arm mounted on the carrier and supporting a marker in permanent contact with the surface of the recording medium, a feed-screw engaging the carrier, and connections between the feed-screw and said piston whereby the feed-screw is operated during the movement of the piston in one direction, substantially as specified.

7. A pressure-recorder having a reciprocatory recording medium, a piston exposed constantly to train-pipe pressure and having the recording medium operatively connected thereto, an inscribing medium including a carrier mounted for transverse movement and a resilient arm on the carrier supporting a marker in permanent contact with the surface of the recording medium, a feed-screw to communicate motion to the carrier, a worm-gear connected by clutch mechanism with said feed-screw to communicate motion in one direction thereto, and a worm operatively connected with the recording medium, substantially as specified.

8. The combination with a pressure-recorder and a piston exposed constantly to train-pipe pressure and having the pressure-recorder operatively connected therewith, of a distance-recorder having an endless recording medium, means for imparting continuous movement thereto, and a marker connected to said piston and adapted to be brought into contact with said recording medium when the pressure in the train-pipe is reduced to a predetermined point, substantially as specified.

In testimony that I claim the foregoing as my own I have hereto affixed my signature in the presence of two witnesses.

SAMUEL L. TERRY.

Witnesses:
JOHN H. SIGGERS,
HAROLD H. SIMMS.